United States Patent [19]

Hamisch et al.

[11] Patent Number: 5,303,588
[45] Date of Patent: Apr. 19, 1994

[54] SENSOR FOR DETERMINING ANGULAR VELOCITY

[75] Inventors: Hansjoachim Hamisch; Manfred Boruschewitz, both of Berlin, Fed. Rep. of Germany

[73] Assignee: Robert Bosch GmbH, Stuttgart, Fed. Rep. of Germany

[21] Appl. No.: 623,925
[22] PCT Filed: May 30, 1990
[86] PCT No.: PCT/DE90/00399
§ 371 Date: Dec. 18, 1990
§ 102(e) Date: Dec. 18, 1990
[87] PCT Pub. No.: WO90/15335
PCT Pub. Date: Dec. 13, 1990

[30] Foreign Application Priority Data

Jun. 1, 1989 [DE] Fed. Rep. of Germany ....... 3917832

[51] Int. Cl.$^5$ ............................................. G01P 9/00
[52] U.S. Cl. ..................................................... 73/505
[58] Field of Search ................................ 73/505, 518

[56] References Cited

U.S. PATENT DOCUMENTS

| | | | |
|---|---|---|---|
| 3,145,572 | 8/1964 | Brindley | 73/505 |
| 4,516,427 | 5/1985 | Carey | 73/505 |
| 4,672,848 | 6/1987 | Gohin et al. | 73/505 |

*Primary Examiner*—John E. Chapman
*Attorney, Agent, or Firm*—Michael J. Striker

[57] ABSTRACT

In a sensor (10) for determining the angular velocity ($\Omega$), an ultrasonic wave is radiated into a sound conductor (11) by means of a piezoceramic shear oscillator (12) as transmitter, two receivers (14, 15) being located adjacent to one another at the other end of the sound conductor (11) so as to be separated from one another by a narrow gap (16). If no angular velocity ($\Omega$) acts on the sensor (10), the ultrasonic wave directed to the gap (16) should excite the two receivers equally, so that the differential signal of the two receivers (14, 15)—supported by an alignment—is equal to zero. If the sensor (10) is located in a rotating system, the ultrasonic ray is deflected by means of the acting Coriolis force ($\vec{K}_c$), so that a differential signal of the two receivers (14, 15) is obtained, which differential signal is a measurement for the angular velocity ($\Omega$). The sensor (10) has a simple, mechanically stable construction with low sensitivity to shaking and temperature.

10 Claims, 1 Drawing Sheet

SENSOR FOR DETERMINING ANGULAR VELOCITY

BACKGROUND OF THE INVENTION

The invention relates to a sensor for determining angular velocity which operates in the manner of the vibratory gyroscopes. Known vibratory gyroscopes with the same field of application generally work with low-frequency flexural vibrations which, as a result of the Coriolis forces occurring in rotation, produce a resonance vibration perpendicularly relative to the primary vibration and accordingly provide a measurement of the angular velocity. However, vibratory gyroscopes have also been proposed which proceed from a thickness shear vibration. In this case, the natural frequency of the oscillator is already substantially higher ($>100$ Khz). Moreover, the excitation of a resonance vibration by Coriolis forces is deliberately dispensed with in the interest of a low temperature dependency of the signal. The Coriolis forces in this case effect a forced longitudinal thickness vibration.

In the present invention, however, a different measurement principle is used: the effect of the Coriolis forces on an ultrasonic wave in a rotating medium. In so doing, a new oscillation form is not brought about. The deflection of the ultrasonic wave in the rotating medium, which is proportional to the angular velocity, produces a measurement signal.

SUMMARY OF THE INVENTION

The sensor for determining angular velocity, according to the invention, has the advantage over vibratory gyroscopes in that it has a low sensitivity to shaking and temperature. It has a simple, mechanically stable construction. The use of a high frequency enables a suppression of low-frequency interference signals which are otherwise caused by shaking or vibrations of the sound conductor installed in the motor vehicle. Since there is no transition to another oscillation form, the same piezoceramic shear oscillators are used in forming the measurement signal as are used in the transmitter. The wide spatial separation of the sensor and signal source facilitates the suppression of the disturbing influences of the excitation voltage on the measurement signal.

It is particularly advantageous for the construction of the sensor that the selected sound frequency be as high as possible based on the sound absorption in order to achieve a good bundling (directionality) of the sound ray. The sound absorption should be high enough so that a continuous acoustic wave is made possible in closest approximation. The bundling (directionality) and accordingly the sensitivity can be further improved through the use of a cylindrical wave instead of a plane wave. The sound velocity should be as low as possible for a high sensitivity, which is achieved substantially through the use of a transverse acoustic wave. ZERODUK is optimally suited as material for the sound conductor.

Embodiment examples of the invention are shown in the drawing and explained in more detail in the following description of preferred embodiments.

DESCRIPTION OF THE PREFERRED EMBODIMENTS

Figure 1:
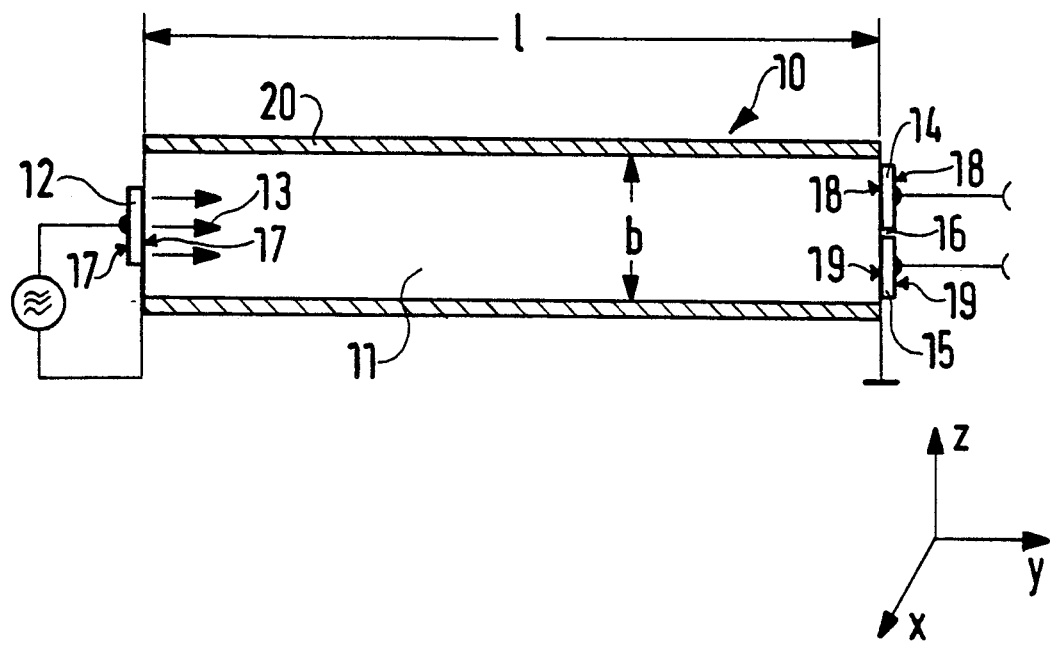
FIGS. 1 and 2 show a longitudinal section through an embodiment example of the sensor according to the invention.

A sensor for determining the angular velocity $\Omega$ of a rotating system, designated by 10 in FIG. 1 comprises a sound conductor 11 with length 1, width b and thickness d. A transmitter 12, particularly a planar piezoceramic shear oscillator by means of which an ultrasonic wave 13 is radiated into the sound conductor 11, is arranged at one end face of the sound conductor 11. Two receivers 14, 15 are located at the other end face of the sound conductor 11, a gap 16 extending parallel to the x direction is located between the two receivers 14, 15. The indicated directions have reference to the system of coordinates plotted in the drawing, wherein the x direction extends orthogonal to the drawing plane and the drawing plane is the yz plane. The vector of the angular velocity $\Omega$ to be determined is orthogonal to the yz plane, i.e. directed parallel to the x direction, so that a ray deflection is effected in the yz plane.

The excitation possibility of the piezoceramic shear oscillator 12 serving as transmitter results from the piezoceramic characteristics of the utilized shear oscillator, i.e. the utilized ceramic plate in which periodic shear vibrations $y_z$ of the ceramic plate are produced by means of an electric alternating field $E_y$. The polar axis of the piezoceramic plate parallel to the z direction lies in the plate plane. The plate thickness is given by the desired ultrasonic frequency. The shear oscillator 12 is excited via the y electrodes 17 to generate shear vibrations in natural frequency which produce a transverse wave in the coupled sound conductor 11. In a known manner, the attitude of the electrode plane is expressed by means of its normal direction.

The receivers 14, 15 are likewise piezoceramic shear oscillators which are excited by means of the occurring transverse ultrasonic wave to form shear vibrations, likewise in natural frequency. Periodic charges are accordingly produced on the y electrodes 18, 19 of the receivers 14, 15 as a result of the direct piezoelectric effect.

The measurement of the angular velocity $\Omega$ is based on the measurement of Coriolis force $\vec{K}_c$ undergone by a mass m moved in a rotating system at velocity v, $\vec{K}_c = 2m \cdot \vec{v} \times \Omega$. In the present case, the oscillating mass elements of the sound conducting medium are regarded as moved masses m. $\vec{v}$ is the velocity at which the mass elements oscillate around their rest position. The amount of the Coriolis force $K_c$ is proportional to the amount of the angular velocity $\Omega$; its direction, which is determined by the vector product $\vec{v} \times \Omega$, changes mathematical signs with the direction of the rotation at the angular velocity $\Omega$. The distance from the axis of rotation has no importance.

The evaluating system of the sensor is based on the following considerations: As a result of the Coriolis forces acting on the moved mass elements m in the rotating system, i.e. under the action of an angular velocity $\Omega$, the wave equations for transverse and longitudinal waves must be supplemented by corresponding terms. Accordingly, after a brief traversed distance 1, plane waves experience a ray deflection $\Delta$, expressed by the formula $$\Delta = -\Omega \cdot \frac{l^2}{2 \cdot v};$$

wherein v is the phase velocity of the ultrasonic wave. Thus, the angular velocity $\Omega$ can be determined by means of measuring the ray deflection $\Delta$. The deflection effect is small, but is sufficient if the demands for the detection limit are not too high.

If an angular velocity $\Omega$ with an axis of rotation parallel to the x direction acts on the sensor 10, the ray is deflected in the yz plane by means of the acting Coriolis force. The two receivers are adjusted to one another at an angular velocity of $\Omega=0$, which means that the measurement signal of the two receivers 14, 15 is of the same magnitude. At an acting angular velocity of $\Omega\neq 0$, the two receivers 14, 15 are excited to different degrees than at a velocity of $\Omega=0$, one to a stronger degree and the other to a weaker degree, due to the deflection of the sound ray. The differential of the received signals of the two receivers 14, 15 forms a differential signal proportional to the angular velocity $\Omega$ which changes its mathematical sign corresponding to the curve of the angular velocity $\Omega$. At high-frequency signals, the change of sign signifies a change in phase of 180°. A direct voltage which is proportional to the angular velocity $\Omega$ and whose mathematical sign indicates the direction of rotation is obtained by means of phase-sensitive rectifiers.

In order to obtain a high sensitivity, i.e. the greatest possible ray deflection, corresponding to the equation indicated above, the rod length 1 can be made as great as permissible based on the application. Based on the same consideration, the sound velocity v of the ultrasonic wave is made as small as possible by means of the use of a transverse wave and the selection of the material of the sound conductor 11. However, the demand for the smallest possible thermal expansion coefficient predominates in the selection of material. Since only a relative movement between the ray and the two receivers 14, 15 is required for forming a differential signal, every bending of the sound conductor 11 in the yz plane results in an unwanted signal generation. The bending of the sound conductor 11 occurring parallel to the z direction due to temperature gradients and producing a relative movement which is linearly dependent on the expansion coefficient is most critical. For this reason, ZERODUR, a glass ceramic manufactured by the Schott company, Mainz (Germany), with its extremely low expansion coefficient for a rod-shaped solid body is the material best suited as sound conductor 11. The expansion coefficient passes through zero at 30° C. and 170° C. and does not exceed the value $6 \cdot 10^{-8} K^{-1}$ in the working temperature range.

The advantage of using liquids for the sound conductor would be a lower sound velocity. However, currents can develop in liquid due to inertial forces and temperature gradients, resulting in undefined disruptive deflections of the sound ray.

The width b of the sound conductor is selected so as to be large enough so that, on the one hand, the sound ray practically does not contact the side surfaces so as not to influence the deflection of the sound ray and so as to prevent sound reflection at the side surfaces to a great extent, and on the other hand the sides of the sound amplitude profile are comprehended by the receivers 14, 15 to a great extent in order to obtain the greatest possible signal. If necessary, a sound absorption layer 20 can also be applied at the sides for further suppression of reflected acoustic waves. The frequency of the ultrasonic wave is made as great as possible for a good bundling of the sound ray. An upper limit for the frequency is provided by the sound absorption in the sound conductor 11. As is known, the absorption increases with the frequency of the ultrasonic wave. The sound absorption reduces the vagrant radiation background (interference signals) resulting from the reflection at the front and side surfaces and is accordingly desirable.

There is an optimal sound absorption at which a maximum signal/background ratio is obtained due to the reduction of the radiation background accompanied by simultaneous attenuation of the wanted signal. The optimum frequency lies in the approximate range of 5 to 10 MHz. This high frequency enables a simple suppression of all low-frequency interference signals which can result from shaking and vibrations of the rod.

The transmitter 12 and the receivers 14, 15 are of the same type and all have y electrodes. The wide spatial separation of the transmitter and receiver sides facilitates the electrical decoupling of the transmitter and receiver areas. The fact that the transmitter and the receivers are of the same type has the following advantages in particular: of the mechanical interference stress produced by shaking and vibrations, only the shear stress component $y_z$ leads to interference charges on the y electrodes.

The temperature gradients in the sound conductor 11 are maintained as low as possible by means of a housing, not shown, comprising favorably heat-conducting material and a heat conduction between the housing and the sound conductor 11 which is as symmetrical as possible. Accordingly, a substantial contribution is made for sufficient suppression of the above-mentioned zero point fluctuation by means of the rod bending, i.e. in the state when no angular velocity $\Omega$ is applied.

Figure 2:
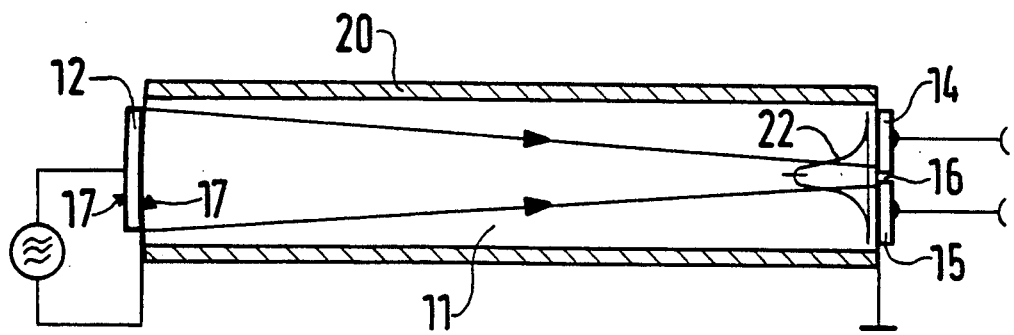

FIG. 2 shows how the bundling (directionality) of the sound ray, already mentioned in the preceding, can be improved. The transverse wave is excited with a cylindrical piezoceramic transducer as transmitter 12a. This transducer 12a focusses the ultrasonic wave on the gap 16 between the two receivers 14a, 15a.

The end face of the sound conductor 11 is adapted with respect to its curvature to the cylindrical transmitter plate 12a. Further, the transmitter 12a can also be made wider, so that the ratio of transducer width to wavelength is doubled e.g. compared to the embodiment example according to FIG. 1, and the edge steepness of the amplitude profile of the wave is accordingly increased. As a whole, the relative change in the excitation intensity of the two receivers 14a, 15a is substantially increased relative to the sensor according to FIG. 1 due to a deflection of the ray, and the signal/noise ratio, i.e. the ratio of the measurement signal to the interference signal, is accordingly improved. The amplitude profile 22 plotted in FIG. 2 close in front of the two receivers 14, 15 results at a rod length 1 of 10 cm, a width of the transmitter 12a of 1.6 cm, and an ultrasonic wavelength of 0.5 mm. The ray width, measured at a drop in amplitude to $A/A_0 = 1/e$, amounts to 0.4 cm when A=amplitude at location z; $A_0$=amplitude at z=0; (maximum amplitude); and e=base of natural logarithms.

We claim:

1. Sensor for determining an angular velocity, comprising: sound conducting medium having two opposite end faces at transitions to another medium; an ultrasonic transmitter arranged at one of said two end faces to radiate a transverse, bundled ultrasonic ray into said medium; at least two ultrasonic receivers arranged at the other of said two end faces, said receivers being separated by a narrow gap such that different signals are detected by respective receivers due to deflection of the transmitted ultrasonic ray caused by a Coriolis force when the angular velocity is applied to said medium; and means for generating a difference signal from said detected signal to serve as measurement signals proportional to the angular velocity.

2. Sensor according to claim 1, wherein the gap (16) between the receivers (14, 15) lies perpendicular to the vector of the angular velocity ($\vec{\Omega}$) to be determined.

3. Sensor according to claim 1, wherein the medium (11) is a solid body.

4. Sensor according to claim 3, wherein the solid body consists of the material ZERODUR.

5. Sensor according to claim 1, wherein said transmitter is a piezoceramic transducer having a polar axis which is oriented at right angles relative to the vector of the angular velocity and parallel to said two end faces of the medium.

6. Sensor according to claim 5, wherein the receivers (14, 15) are piezoceramic shear oscillators.

7. Sensor according to claim 5, wherein the receivers (14, 15) and the transmitter (12) are piezoceramic shear oscillators of the same type and material.

8. Sensor according to claim 1, wherein the sum of the measurement signals of the two receivers (14, 15) is maintained constant by means of an electrical regulation for the excitation voltage of the transmitter (12).

9. Sensor according to claim 1, wherein said transmitter radiates the ultrasonic ray in the form of a transverse cylindrical wave which is focussed on the gap (16).

10. Sensor according to claim 9, wherein the transmitter is a cylindrical piezoceramic shear oscillator (12a).

* * * * *